July 15, 1958  J. N. APGAR  2,843,398
TURNTABLE FOR FIFTH WHEEL TRAILER COUPLINGS
Filed July 3, 1957  2 Sheets-Sheet 1
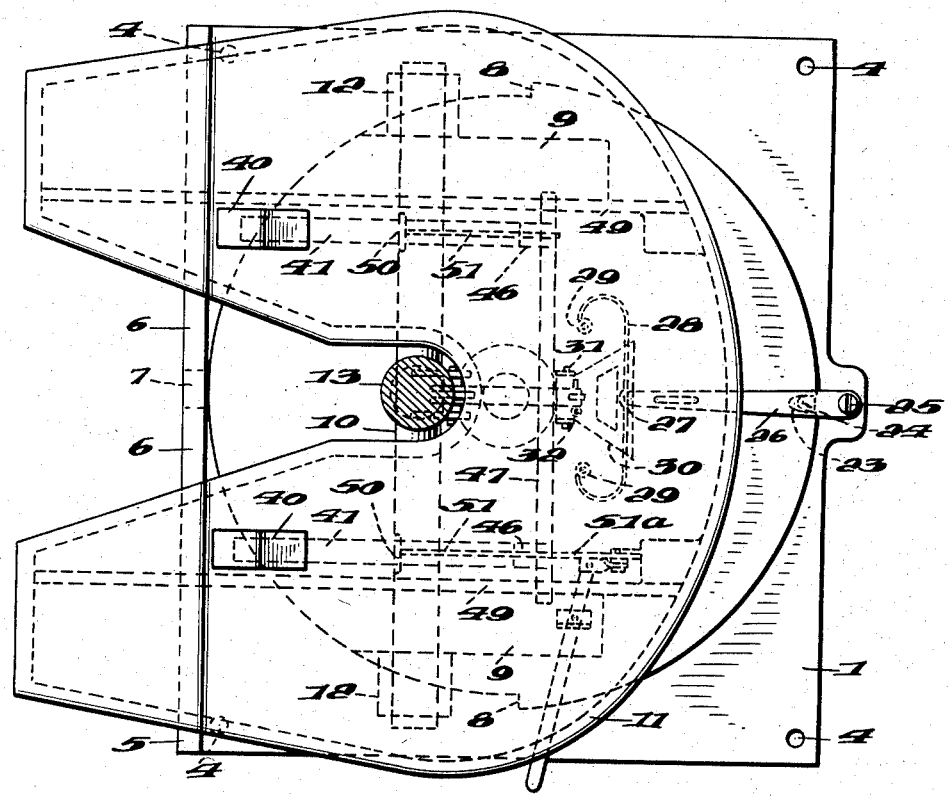
Fig. 1.
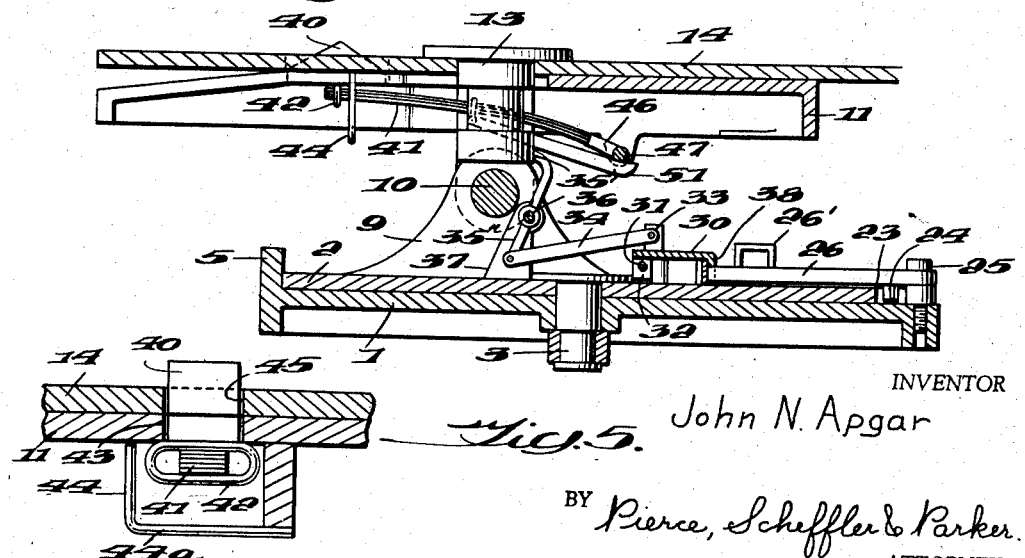
Fig. 2.
Fig. 3.
INVENTOR
John N. Apgar
BY Pierce, Scheffler & Parker.
ATTORNEYS

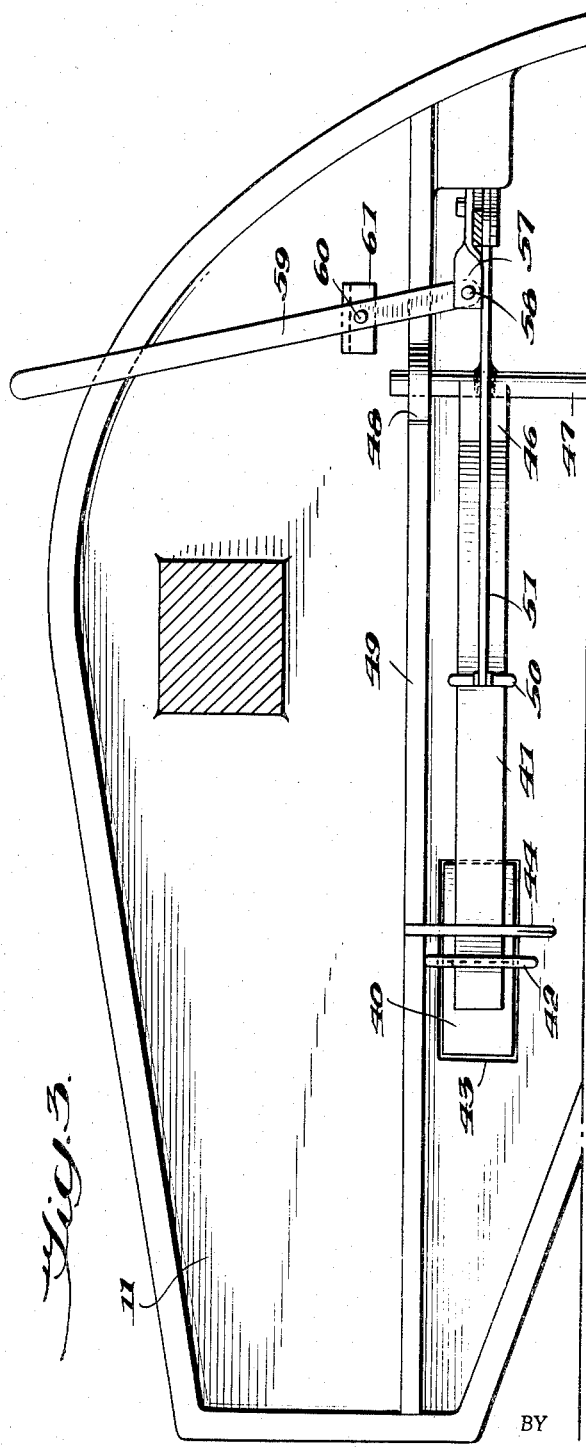

United States Patent Office 2,843,398
Patented July 15, 1958

2,843,398

TURNTABLE FOR FIFTH WHEEL TRAILER COUPLINGS

John N. Apgar, Bound Brook, N. J.

Application July 3, 1957, Serial No. 669,746

2 Claims. (Cl. 280—438)

This invention relates to apparatus for coupling a tractor with a semi-trailer, such apparatus being generally known as a "fifth wheel." The fifth wheel structure not only serves to couple the tractor and trailer but it also supports the front end of the trailer unit since this has no front supporting axles of its own.

With one type of construction, the fifth wheel is mounted on the tractor with its cross shaft bearing structure permanently parallel with the tractor axle and an optimum stable support for the coupled front end of the trailer exists only when the longitudinal axes of the trailer and tractor are co-linear. When there is any pivotal movement between the tractor and trailer at the fifth wheel coupling, the effective support progressively decreases as the turn angle progressively increases, and when the turn angle reaches 90°, better known as the "jacked" position, in which position the tractor axle is at a right angle to the trailer axle, the support at the front end of the trailer, represented by the axis of the cross shaft, is reduced, for all practical purposes, to a straight line since the axis of the cross shaft then lies at a right angle to the trailer axle. Such a construction has many operating disadvantages and hazards such as twisting of the trailer, overloading of the outside drive tires on a turn, trailer turn-over and uncontrollable jackknifing.

With an improved type of construction as shown, for example, in my previous United States Patent No. 2,501,884, granted March 28, 1950, optimum stability of support at the fifth wheel coupling is maintained at all turning angles by maintaining the axis of the trailer supporting cross shaft parallel with the trailer axle at all times. This eliminates, or at least materially reduces, the operating hazards mentioned above and is thus much safer in operation. In general, the desired condition, i. e. maintenance of the cross shaft support axis parallel with the trailer axle, is attained by mounting the fifth wheel, which is carried by the tractor, on a turntable comprising upper and lower turntable plates which are relatively rotatable about a common vertical axis represented by the center of the turntable. The lower plate is made rigid with the tractor and the upper plate which carries the cross shaft and forked lower fifth wheel bearing plate is effectively united with the companion upper fifth wheel bearing plate rigid with the trailer when the two plates are coupled and with the cross shaft parallel with the trailer axle. Thus whenever the tractor is turned relative to the trailer, the upper and lower turntable plates rotate relative to each other and the cross shaft remains parallel with the trailer axle.

In order to unite the upper fifth wheel plate on the trailer with the lower fifth wheel plate on the tractor so that there will be no relative rotation between them it has been proposed, as disclosed in my previous patent aforesaid, to utilize a pair of spaced spring loaded keys mounted on and under the lower fifth wheel plate, these keys projecting upwardly through slots in the plate to engage in correspondingly spaced slots in the upper fifth wheel plate on the trailer. As shown in that patent these locking keys are carried at the free ends of leaf springs which can be rocked about a horizontal axis of pivotal support. In the upper operative position, these keys project through slots in the lower fifth wheel plate so as to be engageable automatically with the slots in the upper fifth wheel plate. Consequently, as the tractor turns relatively to the trailer, the upper fifth wheel plate on the trailer rotates the lower fifth wheel plate and the latter to which the cross shaft is secured rotates the upper turntable plate about the axis of the lower stationary turntable plate on the tractor. A crank associated with the locking key springs is utilized to move them into their upper operative position and to lower them to an inoperative position wherein the locking keys occupy a position below the upper surface of the lower fifth wheel plate and hence do not engage the slots in the upper fifth wheel plate. This lower position of the locking keys is often necessary when tractors having fifth wheel couplings in accordance with my aforesaid Patent No. 2,501,884 are required to be coupled to existing trailers not provided with key-receiving slots and in which event the turntable must be locked against rotation at all times.

These locking keys are important in that the turntable will not, of course, operate satisfactorily to maintain the axis of the trailer supporting cross shaft parallel with the trailer axle unless the lower and upper fifth wheel plates carried respectively by the tractor and trailer are locked by the keys against relative rotational movement. The locking keys must therefore be maintained in their upper, locking positions, under all driving and road conditions. Should it happen that the locking keys become disengaged due to rough road conditions, for example, and permit relative rotation between the lower and upper fifth wheel plates, it is then necessary to stop the tractor-trailer, uncouple the two, realign the cross shaft parallel with the tractor axle and then re-couple. This not only causes delay but is particularly to be avoided since the operator has no way of detecting unlocking of the keys while the tractor-trailer is traveling along the road.

Accordingly, it is a principal object of the present invention to provide an improved arrangement for mounting and operating the locking keys such that there will be a minimum of chance for accidental unlocking.

More particularly it is a prime object of the invention to provide locking keys mounted at the free ends of leaf springs, the opposite ends of the springs being pivotally mounted and the springs being actuated by means of a toggle unit including a lever engageable with the spring intermediate the ends thereof and which applies an upward force to the spring after the key end thereof has been stopped upon reaching its uppermost position.

The foregoing as well as other objects and advantages inherent in the invention will become more apparent from the following description of a preferred embodiment when considered with the accompanying drawings.

In the drawings:

Fig. 1 is a top plan view of the fifth wheel assembly;

Fig. 2 is a view in vertical central section taken on line 2—2 of Fig. 1;

Fig. 3 is a fragmentary bottom plan view drawn to an enlarged scale showing a portion of the bottom of the lower fifth wheel plate on the tractor together with details of the leaf spring mounting by which the locking keys are actuated;

Fig. 4 is a vertical section taken from Fig. 3; and

Fig. 5 is a vertical transverse section taken on line 5—5 of Fig. 4.

With reference now to the drawings, the reference numerals 1 and 2 identify a lower and an upper plate, respectively which are in surface contact and pivotally connected by a pivot pin 3 to form a turntable. The lower plate 1 is preferably of rectangular shape and provided with openings 4 adjacent the corners for receiving clamping bolts, not shown, by which the turntable may be rigidly mounted upon a tractor. The upper turntable plate 2 is approximately circular, but with the rearward one-half of somewhat smaller radius than the forward section so as to clear a reinforcing and stop flange 5 which extends upwardly along the rear edge of the lower turntable plate 1. Openings 6, 6 are cut in flange 5 at opposite sides of the longitudinal axis of plate 1 so as to leave an integral stop rib 7, the openings being of such size that the radial flanges 8, 8 at the junction of the different radius sections of plate 2 may enter the openings to engage the stop rib 7, thereby limiting the turning movement of the tractor to about 90° in either direction with respect to the longitudinal axis of the coupled trailer.

Trunnions 9 are mounted upon turntable plate 2 so as to support a cross or rock shaft 10 with its axis spaced slightly to the rear of turntable pivot pin 3, and the lower bearing plate 11 of the fifth wheel coupling is journalled upon the rock shaft 10 by trunnions 12. The lower fifth wheel plate 11 is of conventional forked or yoke type for receiving the king pin 13 of the cooperating upper fifth wheel bearing plate 14 which is carried by the trailer. An automatic or semi-automatic type of clutch, not shown here but which is illustrated in my previous Patent No. 2,501,884, is mounted on the lower face of plate 11 for locking engagement with the king pin.

The turntable plates must be locked against relative rotational movement when a tractor is to be backed to couple itself to a parked semi-trailer unit thereby to temporarily retain the rockshaft 10 parallel to the tractor axle. The locking elements include a deep notch 23 in the forward edge of the upper turntable plate 2, and a cooperating lug 24 which is movable angularly about a pin 25 mounted at the forward edge of the lower turntable plate 1, the locking lug being integral with and lying below the pivoted end of a longer latching lever 26 which preferably is provided with an eye 26' in which a hooked rod may be engaged for shifting this lever.

Lever 26 extends radially over the plate 2, when the turntable plates 1, 2 are latched together, to seat in a central semicircular bend or recess 27 of a C-shaped spring 28 whose ends are secured to turntable plate 2 by means of bolts 29.

A keeper 30 in the form of a generally trapezoidal plate is pivotally mounted for rotation about a horizontal extending shaft 31 parallel to rock shaft 10, the shaft 31 being supported in apertured spaced lugs 32 upstanding upon the upper face of turntable plate 2. Keeper 30 includes an upstanding integral arm 33 which is connected by a link 34 to the lower end 35" of a rocking lever journalled for rotation intermediate its ends about a shaft 36 parallel with shafts 10 and 31, and which is supported in spaced trunnions 37 also upstanding upon the upper face of turntable plate 2. The rocking lever is located centrally of rock shaft 10 so as to position the upper end 35' in the path of the king pin 13 on the trailer during relative movement of the fifth wheel plates 11 and 14 when the tractor is backed towards a parked trailer for coupling the two together.

The forward edge of keeper 30 includes a depending flange 38 which operates in front of the middle, substantially straight portion of the C-shaped spring 28 and includes a notched portion which engages that end of lever 26 which seats in the central recess 27 of spring 28 thus providing a positive lock for lever 26 and hence preventing untimely release of this lever from spring 28 by flexing of the latter.

The rocking lever is so dimensioned and located that the upper end 35' is engaged by the king pin 13 only during the final movement, for example, during the last inch or inch-and-a-half of relative movement of the fifth wheel plates 11 and 14 into fully coupled position. When king pin 13 engages the rocking lever, the latter is rocked clockwise when viewed in Fig. 2 and this motion as transmitted through link 34 causes the keeper plate 30 to be raised pivotally about its shaft 31 thus converting the previous positive locking of the turntable plates 1, 2 to each other into an impositive latching therebetween established by the lug 24 and notch 23, the effect of which is to release the turntable plates for relative rotation automatically after the coupling between the tractor and trailer has been completed and there is a turning movement of the tractor relative to the trailer. Thereafter for all turning movements of the tractor and trailer the cross shaft 10 remains parallel with the trailer axle. The structural details of the keeper plate and its advantages over prior constructions are not claimed here but rather are more particularly described and claimed in my co-pending application Serial No. 666,842, filed June 20, 1957.

As indicated above, the present invention is concerned with an improved construction for the locking keys which serve to couple the upper fifth wheel bearing plate on the trailer with the lower fifth wheel bearing plate on the tractor and prevent relative rotation therebetween as does occur in conventional fifth wheel assemblies where the axis of the cross shaft remains parallel with the rear axle of the tractor. However, with a fifth wheel assembly utilizing my turntable principle of support, to which the present invention applies, the fifth wheel plate on the trailer must be locked to the fifth wheel plate on the tractor. The effect of this is to lock the cross shaft which serves to carry the front end of the trailer parallel with the rear axle of the trailer. Then as the tractor turns, the relative turning movement occurs at the turntable and not at the fifth wheel plates.

In order to lock the upper and lower fifth wheel plates together it will thus be seen that a pair of locking keys 40 are provided, one on each side of the longitudinal axis of the lower fifth wheel bearing plate 11. Each key 40 is secured to the rear end of a multi-leaf spring 41 beneath plate 11 by means of an elongated loop shaped clamp 42 which encloses the spring, it being noted that the end portions of the clamps 42 extend beyond the edge portions of the slots 43 in the fifth wheel plate 11 in which the keys 40 are entered so as to engage the underface of the plate 11 at the slots and serve as a stop defining the upper limit of movement of the rear ends of the springs 41 and keys 40. Located below the rear portion of each of the springs 41 is a second stop member constituted by the lower horizontal portion 44a of a U-shaped strap 44 which encloses the spring 41. The purpose of the strap 44 is to limit the downward movement of the springs 41 and keys 40 as the springs are lowered to disengage the keys 40 from the slots 45 in the upper fifth wheel plate 14 secured to the trailer, the slots 45, of course, being aligned with the slots 43 in the lower fifth wheel plate 11.

The front end of each spring 41 is entered into a cap 46 which is secured rigidly, as for example by welding, to a transverse, horizontal shaft 47 located beneath the fifth wheel plate 11 parallel to rock shaft 10 and which is carried in bearings 48 provided in ribs 49 on the underface of plate 11.

Surrounding each spring 41 at a point intermediate the ends thereof is a somewhat loosely fitting clamp 50 to which the rear end of a lever 51 is attached. Each lever 51 extends longitudinally forward of the spring 41 beneath the same and also beneath the shaft 47. The front end of one of these levers 51 terminates at the shaft 47 and is secured rigidly to the underportion of shaft 47 such as by welding. The other lever 51 likewise passes beneath the shaft 47 and is likewise secured rigidly thereto as by welding and also includes a forward portion 51a which serves to effect rotation of the levers 51, shaft 47 and the springs 41 about the axis of shaft 47.

A toggle arrangement comprising articulated links 52, 53 is utilized to actuate the levers 51. The outer end of link 52 is articuated at 54 to a stationary point of pivot depending from the lower face of plate 11 and the outer end of link 53 is articulated at 55 to the forward portion 51a of lever 51. The inner ends of the links 52, 53 are articulated together at 56 and also to one end of a connecting link 57, and the other end of link 57 is articulated at 58 to one end of a lever-handle 59 which is pivotally secured at 60 intermediate the ends thereof to a pivot mounting 61 depending from the under face of the lower fifth wheel plate 11.

In general, operation of the handle 59 serves to work the toggle back and forth which in turn causes the levers 51 to rotate about the axis of shaft 47 and raise or lower, as the case may be, the springs 41 and keys 40. The raised position of the springs and keys is indicated by solid lines and the lowered position by broken lines.

In particular, when the handle 59 is actuated in such direction as to cause the springs 41 and keys 40 to be raised, the rear ends of the springs and keys reach their uppermost position defined by contact of the clamps 42 with the under face of fifth wheel plate 11 before the toggle, composed of links 52, 53 and 57, has reached its full throw position. Then as the toggle completes its full throw, the levers 51 and thus shaft 47 will continue to rotate. This continued rotation applies an upward force on the springs 41 intermediate the ends of the latter acting through the clamps 50 which connect the rear ends of the levers 51 with springs 41. A tension is thus established in each of the springs which maintains the springs and keys in their raised positions and effectively prevents the toggle from being accidentally moved to its other position. Of course, the continued rotation of shaft 47 also results in continued pivotal upward movement of the forward ends of the springs 41 but since the rear ends of the levers 51 at the clamps 50 swing through a greater distance than the front ends of springs 41, the end result is that the desired tension in each spring 41 is established at a pressure point defined by the position of clamp 50.

The springs 41 and keys 40 normally remain in the positions shown in full lines, and if the upper ends of the keys are bevelled as is the case in the present embodiment and have no shouldered portions projecting above the upper face of the fifth wheel plate 11, these positions can be maintained even when the tractor is not coupled to the trailer. However, should the locking keys be squared off at the top ends, or should it be necessary to couple the tractor with a trailer not having a fifth wheel plate containing slots for receiving the locking keys 40, it will be necessary to lower the keys to the position indicated in broken lines. This is effected by actuating the handle 59 in the other direction thus causing the toggle to break and permit the levers 51, springs 41 and keys 40 to lower until the lowermost position is reached and which is established when the springs 41 engage the depending strap portions 44a.

In conclusion it will be understood that while the construction which has been described and illustrated may be preferred, it is possible to modify the structures and arrangement of components without, however, departing from the spirit and scope of the inventive concept as defined by the appended claims.

I claim:

1. In a tractor-semitrailer coupling, a pair of superposed and pivotally connected lower and upper turntable plates for mounting upon the tractor, said lower turntable plate being stationary and said upper turntable plate being rotatable, a lower forked fifth wheel plate, means including a horizontal rock shaft for supporting said forked fifth wheel plate on said upper turntable plate for rocking movement about an axis parallel with the semitrailer axle, an upper fifth wheel plate and king pin carried by the front end of the semitrailer for engagement with said lower fifth wheel plate, and means for locking said fifth wheel plates together to prevent relative rotation therebetween, said locking means comprising a leaf spring, a locking key secured to the rear end of said leaf spring, horizontal pivot means mounting the front end of said spring at the underside of said lower fifth wheel plate thereby to enable said leaf spring to be swung about said pivot means in a vertical plane between an upper position wherein said locking key projects through a slot in said lower fifth wheel plate to engage a slot in said upper fifth wheel plate and a lower position wherein said locking key is disengaged from the slot in said upper fifth wheel plate, a lever extending longitudinally of and beneath said leaf spring and secured intermediate its ends to said pivot means, means securing the rear end of said lever to said leaf spring at a point intermediate the ends of the latter, and a toggle connected to the front end of said lever for actuating the same and said leaf spring between its upper and lower positions, said toggle applying an upward tension to said leaf spring through said lever when said leaf spring occupies its upper position.

2. In a tractor-semitrailer coupling, a pair of superposed and pivotally connected lower and upper turntable plates for mounting upon the tractor, said lower turntable plate being stationary and said upper turntable plate being rotatable, a lower forked fifth wheel plate, means including a horizontal rock shaft for supporting said forked fifth wheel plate on said upper turntable plate for rocking movement about an axis parallel with the semitrailer axle, an upper fifth wheel plate and king pin carried by the front end of the semitrailer for engagement with said lower fifth wheel plate, and means for locking said fifth wheel plates together to prevent relative rotation therebetween, said locking means comprising a pair of parallel spaced leaf springs, a locking key secured to the rear end of each leaf spring, a horizontal support shaft mounted beneath said lower fifth wheel plate for rotation about its axis, means securing the front end of each spring to said support shaft thereby to enable said leaf springs to be swung about the axis of said support shaft in a vertical plane between an upper position wherein said locking keys project through slots in said lower fifth wheel plate to engage corresponding slots in said upper fifth wheel plate and a lower position wherein said locking keys are disengaged from the slots in said upper fifth wheel plate, a lever extending longitudinally of and beneath each of said leaf springs and secured at the front ends to said support shaft, means securing the rear end of each said lever to its respective leaf spring at a point intermediate the ends of the latter, an extension on one of said levers projecting forward of the point at which said lever is secured to said support shaft, and a toggle connected to the front end of said lever extension for actuating said levers and said leaf springs between their upper and lower positions, said toggle applying an upward tension to said leaf springs through said levers when said leaf springs occupy their upper positions.

References Cited in the file of this patent

UNITED STATES PATENTS

| | | |
|---|---|---|
| 2,442,914 | Apgar | June 8, 1948 |
| 2,494,982 | Apgar | Jan. 17, 1950 |
| 2,501,884 | Apgar | Mar. 28, 1950 |